United States Patent
Wang

(10) Patent No.: US 10,776,373 B2
(45) Date of Patent: Sep. 15, 2020

(54) FACILITATING ELASTIC ALLOCATION OF ORGANIZATION-SPECIFIC QUEUE RESOURCES IN AN ON-DEMAND SERVICES ENVIRONMENT

(71) Applicant: salesforce.com, inc., San Francisco, CA (US)

(72) Inventor: Xiaodan Wang, Dublin, CA (US)

(73) Assignee: salesforce.com, inc., San Francisco, CA (US)

( * ) Notice: Subject to any disclaimer, the term of this patent is extended or adjusted under 35 U.S.C. 154(b) by 354 days.

(21) Appl. No.: 14/526,151

(22) Filed: Oct. 28, 2014

(65) Prior Publication Data

US 2016/0117195 A1 Apr. 28, 2016

(51) Int. Cl.
| | | |
|---|---|---|
| G06F 9/50 | (2006.01) | |
| G06F 16/2458 | (2019.01) | |
| G06F 16/2453 | (2019.01) | |

(52) U.S. Cl.
CPC ........ *G06F 16/2471* (2019.01); *G06F 9/5072* (2013.01); *G06F 9/5083* (2013.01); *G06F 16/24549* (2019.01)

(58) Field of Classification Search
CPC ........ G06F 17/30864; G06F 17/30067; G06F 17/30545; G06F 17/30595; G06Q 30/02
USPC ....................................................... 707/770
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |

(Continued)

*Primary Examiner* — Pierre M Vital
*Assistant Examiner* — Andrew N Ho
(74) *Attorney, Agent, or Firm* — Jaffery Watson Mendonsa & Hamilton LLP

(57) ABSTRACT

In accordance with embodiments, there are provided mechanisms and methods for facilitating elastic allocation of tenant-specific queue resources in an on-demand services environment in a multi-tenant environment according to one embodiment. In one embodiment and by way of example, a method includes allocating resources to a plurality of tenants, identifying, in runtime, one or more offending tenants of the plurality of tenants and one or more victim tenants of the plurality of tenants. The one or more offending tenants consume above their allocated share of the resources within a message type, and the one or more victim tenants consume below their allocated share of the resources or none of the resources within the message type. The method may further include isolating, in runtime, the offending tenants and the victim tenants, and routing, in runtime, each tenant of the offending tenants and the victim tenants to a queue dedicated to the tenant and the message type.

15 Claims, 8 Drawing Sheets

(56) References Cited

U.S. PATENT DOCUMENTS

| | | |
|---|---|---|
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 7,640,547 B2* | 12/2009 | Neiman ................ G06F 9/5044 705/5 |
| 9,135,259 B2* | 9/2015 | Westerman ........... G06F 16/128 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0046396 A1* | 3/2003 | Richter .................. G06F 9/505 709/226 |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0164635 A1* | 6/2009 | Denker ................ H04L 63/105 709/226 |
| 2009/0177744 A1 | 7/2009 | Marlow et al. |
| 2009/0328050 A1* | 12/2009 | Liu ....................... G06F 9/5088 718/104 |
| 2010/0235495 A1* | 9/2010 | Petersen ............. H04L 63/1458 709/224 |
| 2011/0246434 A1* | 10/2011 | Cheenath ........... G06F 17/3038 707/703 |
| 2012/0066020 A1* | 3/2012 | Moon ................ G06Q 10/0635 705/7.28 |
| 2012/0265741 A1* | 10/2012 | Moon .................... G06F 9/5083 707/694 |
| 2012/0317578 A1* | 12/2012 | Kansal .................. G06F 9/5077 718/104 |
| 2013/0204991 A1* | 8/2013 | Skjolsvold ............ G06F 9/5083 709/223 |
| 2014/0359113 A1* | 12/2014 | Krebs .................. H04L 41/5009 709/224 |
| 2014/0379924 A1* | 12/2014 | Das ........................ H04L 47/72 709/226 |
| 2015/0067069 A1* | 3/2015 | Gourevitch ............ H04L 51/12 709/206 |

* cited by examiner

US 10,776,373 B2

FACILITATING ELASTIC ALLOCATION OF ORGANIZATION-SPECIFIC QUEUE RESOURCES IN AN ON-DEMAND SERVICES ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to facilitating elastic allocation of tenant-specific queue resources in an on-demand services environment.

BACKGROUND

Conventional message queueing techniques require that queues are manually created and assigned as separate physical queues to certain tenants to try to remedy traffic jams and thus, such techniques are inefficient and costly as they are prone to delays and human errors.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
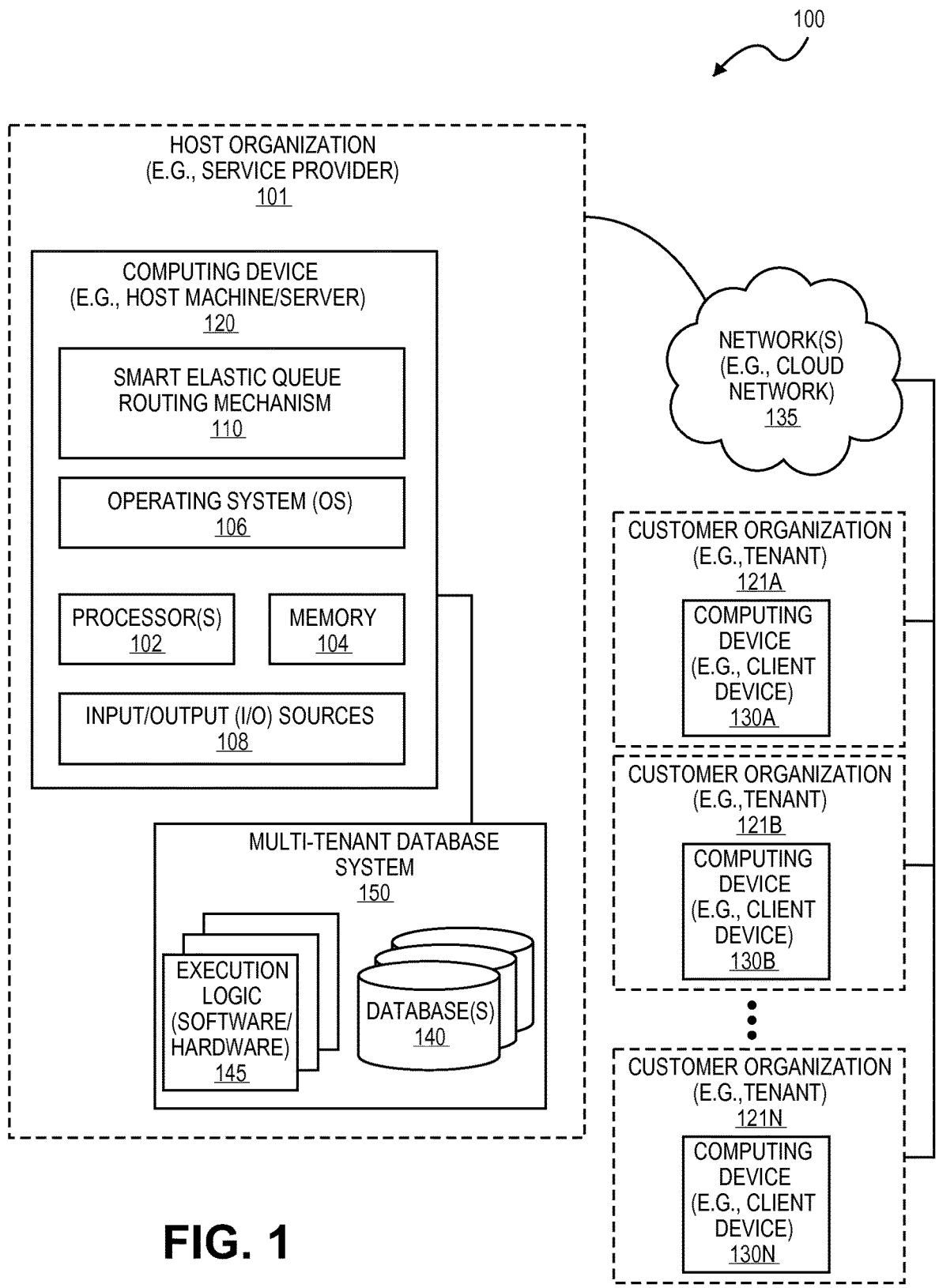
FIG. 1 illustrates a system having a computing device employing a smart elastic queue routing mechanism according to one embodiment.

In accordance with embodiments, there are provided mechanisms and methods for facilitating elastic allocation of tenant-specific queue resources in an on-demand services environment in a multi-tenant environment according to one embodiment. In one embodiment and by way of example, a method includes allocating resources to a plurality of tenants, identifying, in runtime, one or more offending tenants of the plurality of tenants and one or more victim tenants of the plurality of tenants. The one or more offending tenants consume above their allocated share of the resources within a message type, and the one or more victim tenants consume below their allocated share of the resources or none of the resources within the message type. The method may further include isolating, in runtime, the offending tenants and the victim tenants, and routing, in runtime, each tenant of the offending tenants and the victim tenants to a queue dedicated to the tenant and the message type.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

Methods and systems are provided for facilitating elastic allocation of tenant-specific queue resources in an on-demand services environment in a multi-tenant environment according to one embodiment.

Embodiments provide for elastic allocation of tenant-specific queues for workload isolation and service protection in a multi-tenant environment. Embodiments provide a mechanism for identifying and targeting one or more organizations ("offending" or "misbehaving" organizations) that are found to be consuming beyond their fair share of resources within a message type and those one or more organizations ("starving" or "victim" organizations) that are starved of resources.

It is contemplated that in a large-scale, multi-tenant queueing system that services hundreds of millions of queries or messages on daily-basis, misbehaving (also referred to as "over-consuming" or simply "offender") and/or starving (also referred to as "under-consuming" or simply "victim") tenants are often encountered and held responsible for adversely impacting the overall system performance. It is contemplated that misbehaving tenants refer to those customer organizations who are regarded as over-consuming the message queue resources (e.g., consuming more than their allocated or expected share of resources, such as by submitting a great number of queries or messages, etc.) and consequently, causing traffic jams in queues and burdening the overall system. Similarly, it is further contemplated that starving tenants refer to those customer organizations who are deprived of their allocated or expected share of message queue resources (typically due to misbehaving tenants).

Embodiments provide for a smart routing framework to offer a dynamic, automated, and extensible system to ensure fair usage of message queue resources by splitting and/or coalescing tenant-specific queues for efficiently isolating workloads (e.g., managing misbehaving tenants who monopolize resources, etc.) along with protecting services (e.g., flood detection, such as detecting misbehaving tenants flooding broker memory (e.g., Apache™ Qpid™, etc.). For example, embodiments provide for: 1) dynamically creating and assigning queues at runtime; 2) automatic decision-making with regard to splitting and coalescing of tenants; 3) allowing for alternative policy decisions, such as adding tenant-specific queues in future; and 4) dynamically reconciling any potential conflicts regarding whether certain tenants ought to split or coalesce.

It is contemplated that embodiments and their implementations are not merely limited to multi-tenant database system ("MTDBS") and can be used in other environment, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a system 100 having a computing device 120 employing a smart elastic queue routing mechanism 110 according to one embodiment. In one embodiment, computing device 120 includes a host server computer serving a host machine for employing smart elastic queue routing mechanism ("elastic mechanism") 110 for facilitating elastic allocation of message queue resources to tenants in a multi-tiered, multi-tenant, on-demand services environment.

It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types which may relate to or be associated with one or more customer organizations, such as customer organizations 121A-121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc., serving as a customer or client of host organization 101 (also referred to as "service provider" or simply "host") (e.g., Salesforce®) serving as a host of elastic mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitation) one or more of customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 100 may include (without limitation) server computers (e.g., cloud server computers, etc.), desktop computers, cluster-based computers, set-top boxes (e.g., Internet-based cable television set-top boxes, etc.), etc. Computing device 100 includes an operating system ("OS") 106 serving as an interface between one or more hardware/physical resources of computing device 100 and one or more client devices 130A-130N, etc. Computing device 100 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 130 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
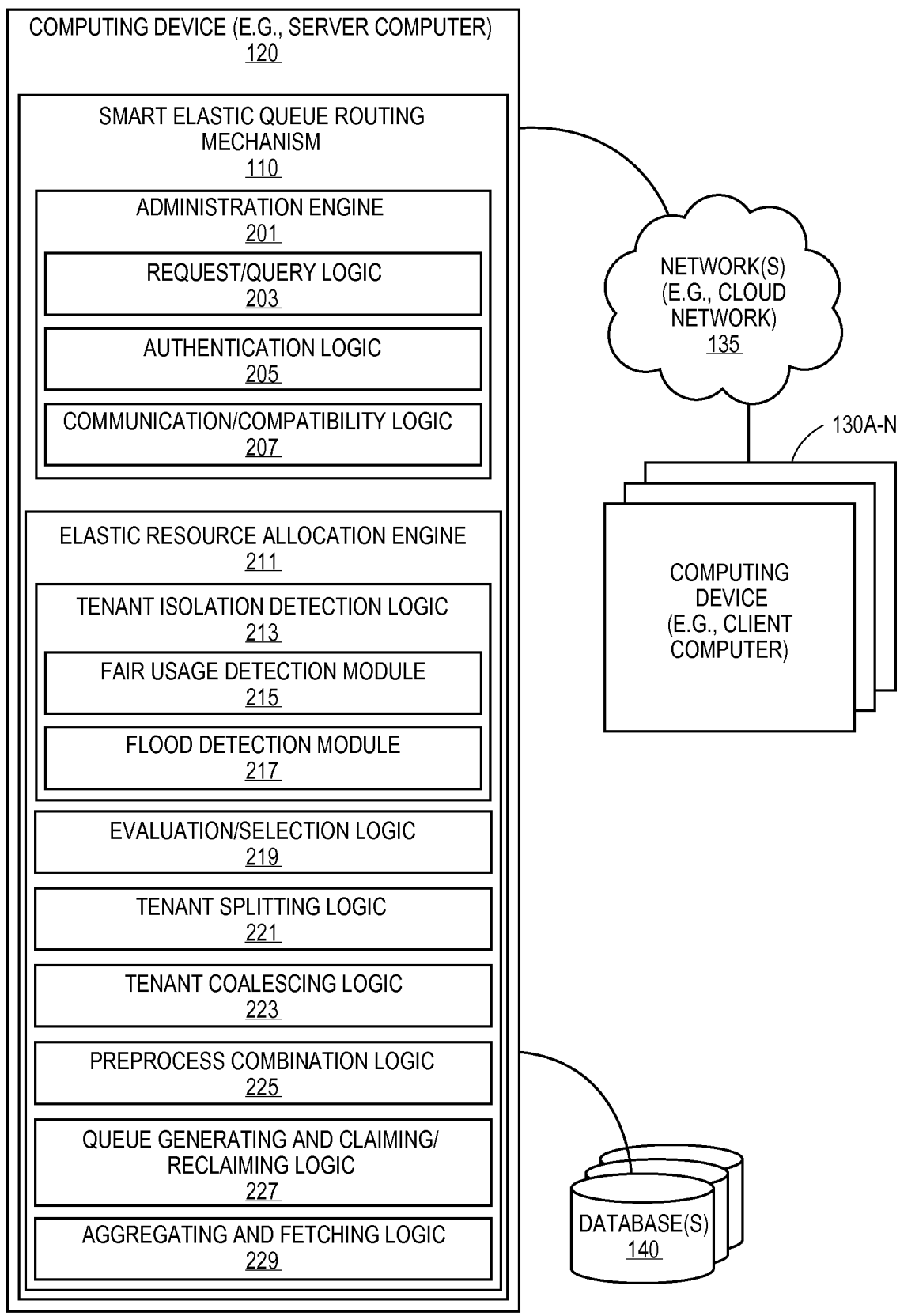
FIG. 2 illustrates a smart elastic queue routing mechanism according to one embodiment.

FIG. 2 illustrates a smart elastic queue routing mechanism 110 according to one embodiment. In one embodiment, elastic mechanism 110 may include a number of components, such as (without limitation and not necessarily in this order): administration engine 201 and elastic resource allocation engine ("allocation engine") 211. In one embodiment, administration engine may include a number of components, such as (without limitation and not necessarily in this order) request/query logic 203, authentication logic 205, and communication/compatibility logic 207. Similarly, in one embodiment, allocation engine 211 may include a number of components, such as (without limitation and not necessarily in this order): tenant isolation detection logic ("detection logic") 213 including fair usage detection module ("fair usage module") 215 and flooding detection module ("flooding module") 217; evaluation/selection logic 219; tenant splitting logic ("splitting logic") 221; tenant coalescing logic ("coalescing logic") 223; preprocess combining logic ("combining logic") 225; queue generating claiming/reclaiming logic ("queue logic") 227; and aggregating and fetching logic 229.

Throughout this document, terms like "framework", "mechanism", "engine", "logic", "component", "module", "tool", and "builder" may be referenced interchangeably and include, by way of example, software, hardware, and/or any combination of software and hardware, such as firmware. Further, any use of a particular brand, word, or term, such as "elastic", "message", "queue", "allocation", "split", "coalesce", "preprocess combination", etc., and/or any of their forms, such as "queuing", "allocating", "splitting", "coalescing", "preprocess combiner", etc., should not be read to limit embodiments to software or devices that carry that label in products or in literature external to this document.

As aforementioned, with respect to FIG. 1, any number and type of requests and/or queries may be received at or submitted to request/query logic 203 for processing. For example, incoming requests may specify which services from computing device 120 are to be provided, such as query requests, search request, status requests, database transactions, graphical user interface requests and interactions, processing requests to retrieve, update, or store data, etc., on behalf of one or more client devices 130A-N, code execution requests, and so forth.

In one embodiment, computing device 120 may implement request/query logic 203 to serve as a request/query interface via a web server or as a stand-alone interface to receive requests packets or other requests from the client devices 130A-N. The request interface may further support the return of response packets or other replies and responses in an outgoing direction from computing device 120 to one or more client devices 130A-N.

Similarly, request/query logic 203 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 205 may operate on behalf of the host organization, via computing device 120, to verify, authenticate, and authorize, user credentials associated with users attempting to gain access to the host organization via one or more client devices 130A-N.

In one embodiment, computing device 120 may include a server computer which may be further in communication with one or more databases or storage repositories, such as database(s) 140, which may be located locally or remotely over one or more networks, such as network(s) 235 (e.g., cloud network, Internet, proximity network, intranet, Internet of Things ("IoT"), Cloud of Things ("CoT"), etc.). Computing device 100 is further shown to be in communication with any number and type of other computing devices, such as client computing devices 130A-N, over one or more networks, such as network(s) 140.

As aforementioned, any misbehaving tenants can overburden a system and adversely impact the overall system. Such misbehaving tenants can also take away resources from other tenants and cause them to starve for even minimal resources. Accordingly, any such misbehaving tenants are to be identified and dealt with early in the process. In one embodiment, as will be further described, detection logic 213 of allocation engine 211 may be used to detect and identify any number and type of misbehaving tenants as well as starving tenants within the system so that they may be isolated and appropriately handled.

In detecting and identifying misbehaving and/or starving tenants, for example, for starvation resistance purposes, one or more misbehaving tenants are identified who are regarded as responsible for monopolizing resources at the head of the queue, resulting in increased latency for other tenants' jobs that are stuck behind the monopolizing tenants in the same queue. Further, for example, for flooding purposes, one or more misbehaving tenants are identified for traffic isolation as the identified tenants' messages may be flooding and overwhelming memory/heap space on the queue broker (e.g., Qpid broker, etc.).

In case of starvation resistance, for example, messages from one or more tenants may be long running and/or central processing unit ("CPU") intensive, which may monopolize message queuing thread resources by reducing thread time made available to other tenants within the same message or job type. Similarly, with regard to flooding purposes, for example, one or more tenants may be responsible for flooding the message queue with any number and type of messages (e.g., millions of messages) within a short period of time, causing broker heap space to overflow. This, in turn, can starve other tenants by forcing their incoming messages to spin to a disk or, in some severe circumstances, bring down the queue broker.

It is contemplated that in a multi-tenant environment (e.g., Salesforce® multi-tenant environment), message queues may operate at an enormous scale accommodating a great number of messages (e.g., exceeding hundreds of millions of messages daily across hundreds of thousands of tenants, etc.) which makes the conventional techniques of manually isolating misbehaving tenants impractical, cumbersome, and unscalable. Embodiments provide for a novel and innovative elastic mechanism 110 to facilitate a dynamic, automated, and extensible queue routing framework to split and/or coalesce tenant-specific queues for isolating workloads (e.g., misbehaving tenants that monopolize workloads, etc.) while protecting services (e.g., misbehaving tenants that flood queue broker memory, etc.). The dynamic nature of elastic mechanism 110 provides for creating and reassigning queues at runtime, while the automatic nature of elastic mechanism 110 offers splitting and coalescing decisions that are taken without necessitating any manual intervention. Further, elastic mechanism 110 is extensible because alternative policy decisions necessitating tenant-specific queues may be added with ease.

In one embodiment, this dynamic, automatic, and extensive elastic creation and assignment of physical queues to individual tenants may be performed using one or components of elastic mechanism 110, such as splitting logic 221, coalescing logic 223, combining logic 225, etc. For example and in one embodiment, splitting logic 221 and coalescing logic 223 may be implemented in pairs according to a specific policy (e.g., protect broker memory or prevent monopolization of resources, etc.). In one embodiment, coalescing may be performed when queue resources may be scarce and need to be managed with care. For example, on each production instance, any number of physical queues, such as 6000 physical queues, may be allocated so that when a tenant-specific queue is no longer necessitated, it may be coalesced by coalescing logic 223 such that the tenant-specific queue may be reused by another tenant.

In one embodiment, combining logic 225 may be used to merge decisions from competing split/coalesce policies and submit them to a routing table to create and assign a number of physical queues to their designated tenants. For example and in one embodiment, this technique may be used for a fair usage policy to protect against monopolization of message queue resources by one or more misbehaving tenants.

In some embodiments, fair usage module 215 of detection logic 213 may be used to identify usage offenders or misbehaving tenants and victims or starving tenants (e.g., message types that are using too much or too little thread time, etc.) and accordingly, demote or promote the relevant queues to different tiers. Now, if, for example, merely one or a few tenants are determined to be usage offenders, then they can starve out other tenants within the same message type if every tenant shares the same physical queue (e.g., Qpid queue, etc.). Accordingly, in one embodiment, messages for offending tenants are split out into dedicated queues where such queues are then demoted to a lower tier to give other tenants more thread time.

This may be accomplished by, for example, first, identifying usage offenders, via fair usage module 215, and then splitting, via splitting logic 221, the usage offenders into dedicated queues so fair usage may be applied on them, where the dedicated queues may be generated using queue logic 227. Stated differently, in some embodiments, using a combination of fair usage module 215, splitting logic 221, and/or queue logic 227, fair usage may be used to split tenants from shared message types queues to dedicated tenant specific queues. Similarly, in some embodiments, fair usage module 215 may be used with coalesce logic 223 and/or queue logic 227 to implement fair usage such that once traffic volume in queues has subsided and fair usage may no longer be a concern, one or more tenant-specific/dedicated queues may be reclaimed by coalescing them with shared message type queues.

In one embodiment, splitting logic 221 may be used to output misbehaving tenants with regard to a specific message or job type. For example, such split decisions may be emitted in the context of a particular message type such that a tenant marked as misbehaving in the context of one message type (e.g., APEX_FUTURE) may not necessarily be misbehaving in the context of another message type (e.g., DASHBOARD). In one embodiment, splitting logic 221 may be provided via a relatively simple interface. For example, for fair usage, queue latency and/or thread time utilization may be used as triggers for identifying misbehaving tenants as facilitated by fair usage module 215. Further, for example, for heap/memory protection, queue depth (e.g., number of messages in the queue, etc.) and/or new message enqueue rate may be used to identify misbehaving tenants as facilitated by flooding module 217.

In one embodiment, coalescing logic 223 may be used to output tenants for a specific message or job type that are no longer misbehaving. Since the number of physical queues may be finite, in some embodiments, certain tenant-specific queues may be recycled and reclaimed by collapsing their traffic into a single and shared queue for the message type in question. This migration of existing traffic may be used to minimize variability due to transient traffic conditions. In some cases, when a coalescence decision as facilitated by coalescing logic 223 may come in conflict with a split decision as facilitated by splitting logic 221 (since, for example, coalescing may be based on a queue's local state, etc.), evaluation/selection logic 219 may choose the split decision over the coalescence decision. In some embodiments, evaluation/selection logic 219 may be used to make decisions and selections when conflicts may not be resolved by splitting logic 221, coalescing logic 223, and combining logic 225. In one embodiment, splitting logic 221, coalescing logic 223 may be presented via a single interface.

In one embodiment, combining logic 225 may be used to merge outputs from various (potentially conflicting) split-coalesce decisions. For example, while fair usage policies as applied by fair usage module 215 may indicate that a tenant may be safe for reclaiming, heap/memory protection policies as applied by flooding module 217 may dictate that the tenant may still needs to remain in a separate queue because it may have flooded the queue broker with any number of messages (e.g., millions of messages, etc.). In such cases, in one embodiment, combining logic 225 may reconcile such split/coalesce decisions and pass them on to queue logic 227 where physical queues may be created and assigned to the relevant tenants.

When tenants share queues at a message type level, there may be limited visibility into messages on the queue. In this case, in one embodiment, traffic patterns may be inferred on the queue by observing messages processed in the recent time period as facilitated by detection logic 213. In another embodiment, queues may be browsed by detection logic 213. As such, fair usage module 215 may take a reactive approach that may involve 1) identifying when a shared message type queue may be delayed by a misbehaving tenant, and 2) approximating a list of potentially misbehaving tenants as candidates for splitting into dedicated queues.

For example, in one embodiment, splitting logic 221 may first seek shared node/message type queues and filter queues that are suffering from high latency (e.g., period of time, such as 20 or more, etc.). Similarly, for queues suffering high delay, a recent thread time usage (e.g., past 30 minutes, etc.) grouped by each tenant and/or message type may be collected by splitting logic 221. In one embodiment, the thread time may be tracked at a given granularity (e.g., 5 minutes) for each tenant and/or message type combination. For example, if a queue associated with a message type (e.g., APEX_FUTURE) and tenant has processed at least one message then their thread times are aggregated. In one embodiment, using splitting logic 221, each tenant and/or message type may then be ranked by a decreasing order of thread time (e.g., top 10 highest thread times, etc.) in which the highest thread-consuming tenants may be selected as candidates for splitting. It some embodiments, a configurable threshold may be used to filter out those tenants that are regarded as consuming a negligible amount of thread time and evaluated and selected by evaluation/selection logic 219. Further, evaluation/selection logic 219 may be used to determine the various aforementioned factors, such as what defines high latency, low latency, high thread times, etc.

Once the traffic subsides and the delay is no longer present on a message type level and/or tenant-specific queues, coalescing logic 225 may reclaim or recapture queues allotted to offending tenants who are no longer misbehaving. In one embodiment, reclaiming may refer to coalescing any messages from the tenant-specific queues back to being shared, message type level queues and recycling the tenant-specific queues for reuse by various tenants in the system. In one embodiments, any coalescing decision as facilitated by coalescing logic 225 may be evaluated and selected by evaluation/selection logic 219 based on one or more factors or criteria, such as (without limitation) dequeue latency (also referred to as "delay"), and thread time consumption.

In some embodiments, any number and type of policies may be employed or implemented, such as fair usage policy, flood detection (e.g., broker heap/memory protection) policy, etc., to be used for splitting, coalescing, etc., as described above. Further, for example, various tasks may be performed in any particular order to achieve certain results;

however, embodiments are not limited as such, such as the fair usage policy may be ordered before the flood detection policy which may mean that any tenants marked for dedicated queues by fair usage module 215 may take priority when evaluated by combining logic 225. Further, for example, there may be a limit on the number of tenant-specific queues (e.g., 10 queues) that the router may allow per message type. As such, once the limited is reached, policies that are ordered further back may no longer split tenants in dedicated queues.

In one embodiment, fair usage implementation of tenant splitting via splitting logic 221 and tenant coalescing via coalescing logic 223 provide for returning of a combination of tenants and message types that are then isolated into tenant-specific queues via fair usage module 215 of detection logic 213 and queue logic 227. For example, first, a list of in-use queues may be collected from a production router and the longest waiter dequeue latency for each message type queue is determined. Using this information, a tenant-specific queue may be created via queue logic 227 if an organization's total utilization is determined to be a certain percentage (e.g., 0.5%) of a total available message queue thread capacity or such as facilitated by evaluation/selection logic 219. Further, the lists of organization may be sorted by decreasing thread time so that the highest consumers receive priority in getting queues assigned to them.

In some embodiments, an input of an organization and/or a message type may be taken and returned whether its tenant-specific queue is safe to coalesce such that coalescing logic 223 first collects the destination queue of both the tenant-specific queue and the corresponding shared, message type level queue. It may then query the queue broker to determine dequeue latency on each of these queues. For example, if both queues experience a delay of less than a threshold period of time (e.g., 2 minutes or 10% of 20 minutes, etc.), then thread time consumption is checked and verified by evaluation/selection logic 219. The determined thread time for each of the organization and the message type may be determined from metering and it is used to verify whether the thread time is less than a predetermined percentage (e.g., 0.15% or 30% of 0.5%, etc.) of the total available message queue capacity.

In one embodiment, tenant isolation detection logic 213 may be invoked, where the list of tenants for fair usage may be stored, such as at database 140, as facilitated by fair usage module 215. For splitting, in one embodiment, splitting logic 221 may be invoked to collect the list of tenants output by each implementor of tenant splitting. Upon collecting these, dedicated queues may be created by queue logic 227 for each combination (e.g., up to 10 queues per tenant/ message type combination, etc.). Similarly, for coalescing, in one embodiment, coalescing logic 223 may be invoked to iterate over each tenant-specific queue, where for each queue, it queries each implementor to determine if coalescing is a safe option. For example, coalescing of a tenant may occur if each implementor (e.g., whether fair usage or flood detection) agrees that the tenant is safe to coalesce.

In some embodiments, outputs (e.g., list of tenants, list of message types, etc.) relating to fair usage and/or flooding may be detected by detection logic 213 and collected by splitting logic 221 and coalescing logic 223. If a tenant has been marked for splitting (such as due to conflicting outputs, etc.), the marked tenant may then be dropped from coalescing. Those tenants that are to receive dedicated queues are initialized as facilitated by queue logic 227 and all other tenants that identified as candidates for splitting by competing policies are evaluated by evaluation/selection logic 219.

Further, in some embodiments, tenants may be added in an order but once a message types has reached a maximum number of queues allowed (e.g., 10 queues, etc.), the remaining tenants for that message type may be ignored as detected and facilitated by detection logic 213. Additionally, existing tenant queues that are created at some prior point in time may be evaluated by evaluation/selection logic 219 and, in some embodiments, existing queues may be added back for coalescing for reclaiming by coalescing logic 223 if the message type has reached a maximum limit of tenant queues (e.g., 10 queues, etc.) or a large batch of new tenants are marked for splitting with higher priority, etc. The coalescing outputs are forwarded on to a routing table, such as routing table 301 of FIG. 3 which may be part of database 140, as facilitated by queue logic 227, which, in turn, creates and reclaims the corresponding physical queues.

In one embodiment, split and coalesce decisions invoked by splitting logic 221 and coalescing logic 223, respectively, may be taken separately but close together in time and based on, for example, the same set of output data, such as dequeue latency and/or thread time consumption, etc. To obtain dequeue latency, using aggregating and fetching logic 229, an interface (e.g., jmx interface) of a queue broker (e.g., Qpid broker) may be queried to determine and fetch the wait time of message on each queue. To obtain thread time, using aggregating and fetching logic 229, various measurements for multiple servers (e.g., memcached servers, etc.) may be aggregated. This way, fetching the required metadata more than once is avoided by caching the intermediate results for fair usage and further, by refreshing the cache merely when more than 60 seconds stale. The cache may be refreshed using one or more of the following processes: 1) refresh metering cache, where thread time measurements for each tenant and message type combination (with at least one message processed) are aggregated, via aggregating and fetching logic 229, over a span of a predetermined sliding window (e.g., 30 minutes, etc.); and 2) refresh queue cache, where a snapshot of the routing table is taken, via aggregating and fetching logic 229, to determine the list of queues currently taking messaging traffic. Then, it queries queue brokers (e.g., Qpid brokers) for dequeue latency for each queue and stashes these measurements in a local map.

Communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

It is contemplated that any number and type of components may be added to and/or removed from elastic mechanism 110 to facilitate various embodiments including adding, removing, and/or enhancing certain features. It is contemplated that embodiments are not limited to any particular technology, topology, system, architecture, and/or standard and are dynamic enough to adopt and adapt to any future changes.

Figure 3:
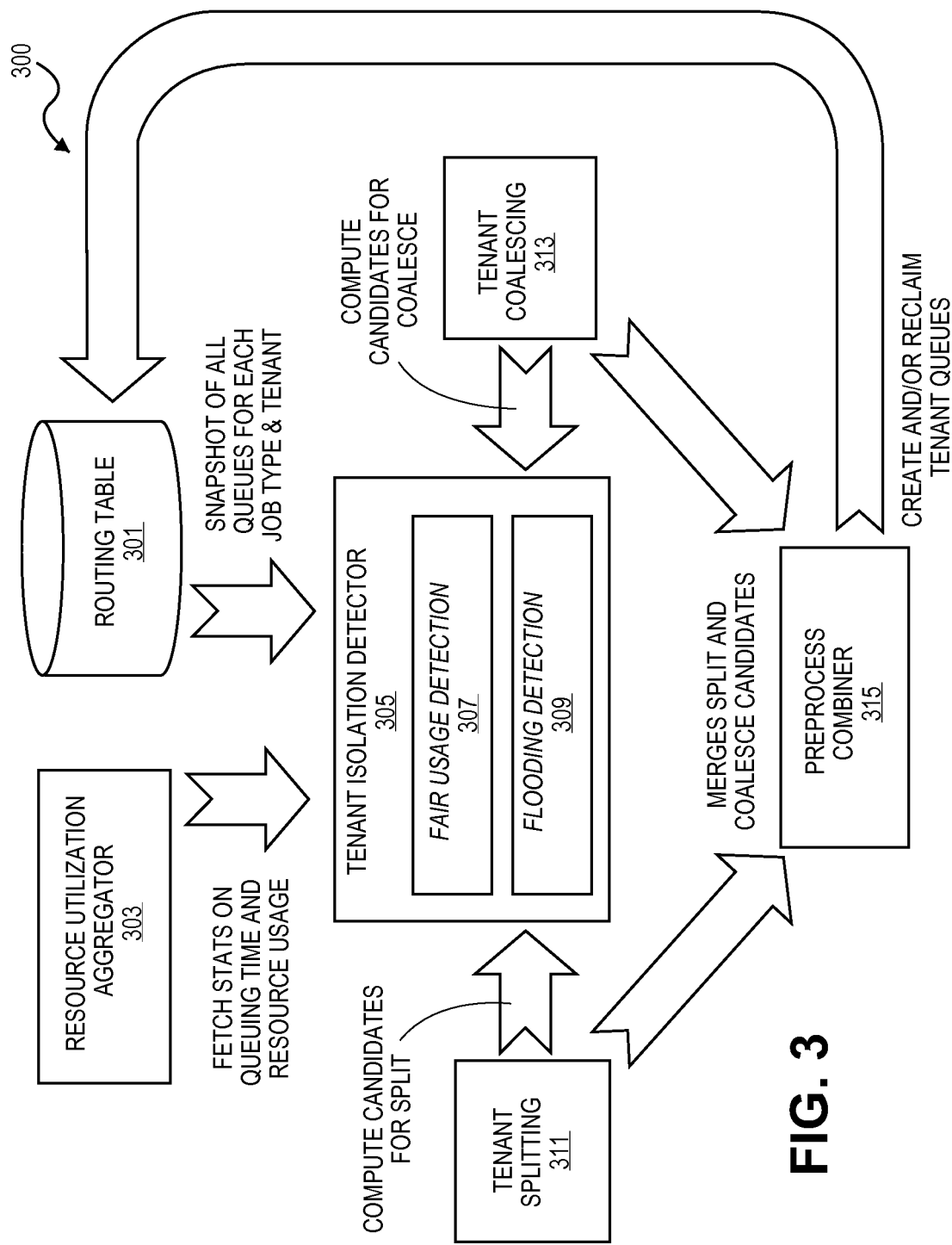
FIG. 3 illustrates a transaction sequence for facilitating elastic allocation of tenant-specific queue resources according to one embodiment.

FIG. 3 illustrates a transaction sequence 300 for facilitating elastic allocation of tenant-specific queue resources according to one embodiment. Transaction sequence 300 may be performed by processing logic that may comprise hardware (e.g., circuitry, dedicated logic, programmable logic, etc.), software (such as instructions run on a processing device), or a combination thereof. In one embodiment, transaction sequence 300 may be performed or facilitated by elastic mechanism 110 of FIGS. 1-2. The processes of transaction sequence 300 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

In one embodiment, transaction sequence 300 is shown to employ one or more components, such as routing table 301, which may be part or one of databases 140 of FIG. 1, such as data structure being used as a repository for queuing message types. In one embodiment, transaction sequence 300 is further shown to employ resource utilization aggregator 303, as facilitated by (or interchangeably referred to as) aggregation and fetching logic 229 of FIG. 2, may be used for aggregating and then fetching statistics relating to queueing time and resource usage to tenant isolation detector 305. Similarly, in one embodiment, tenant isolation detector 305, as facilitated by (or interchangeably referred to as) tenant isolation detection logic 213 of FIG. 2, may receive snapshots of various queues for each of tenant and/or message type.

In one embodiment, tenant isolation detector 305 may perform fair usage detection 307 as facilitated by fair usage detection module 215 and flooding detection 309 as facilitated by flooding detection module 217 of FIG. 2. In one embodiment, various tenants may be computed or determined to be good candidates for tenant splitting 311 or tenant coalescing 313 as facilitated by tenant splitting logic 221 and tenant coalescing logic 223, respectively, of FIG. 2. This tenant information may be detected by and/or shared with tenant isolation detector 305.

As previously discussed with reference to FIG. 2, certain splitting and/or coalescing tenants may be regarded good candidates for merging and subsequently, such candidate tenants are merged via preprocess combiner 315 as facilitated by (or interchangeably referred to as) preprocess combining logic 225 of FIG. 2. In one embodiment, relevant tenant queues are created and/or reclaimed via queue logic 227 of FIG. 2 and this information, including any created/reclaimed queues, is communicated back to routing table 301.

Figure 4A:
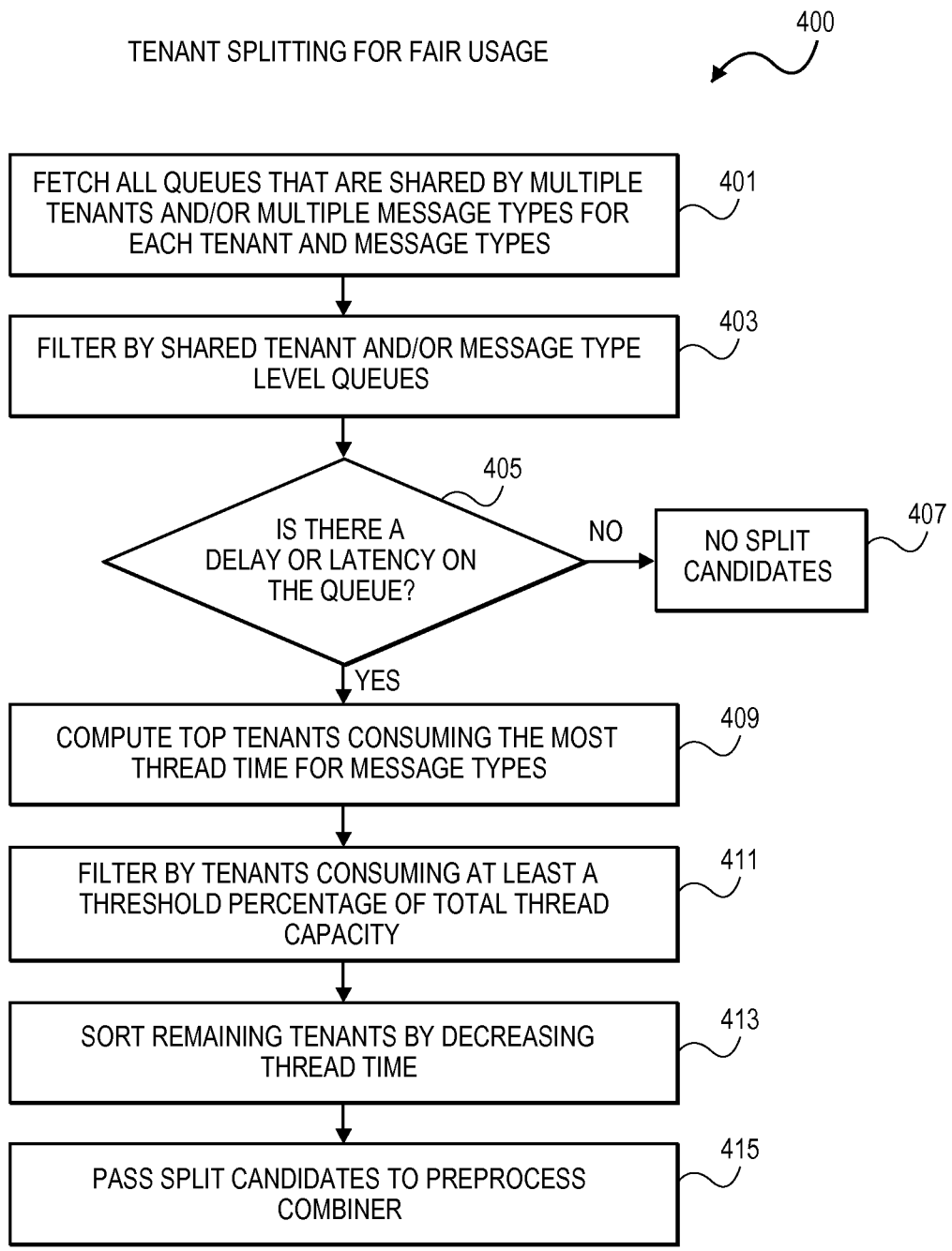
FIG. 4A illustrates a method for facilitating tenant splitting for fair use using elastic allocation of tenant-specific queue resources according to one embodiment.

FIG. 4A illustrates a method 400 for facilitating tenant splitting for fair use using elastic allocation of tenant-specific queue resources according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed or facilitated by elastic mechanism 110 of FIGS. 1-2. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

Method 400 for tenant splitting for fair use may begin at block 401 with fetching of queues that are shared by multiple tenants. The aforementioned shared tenant level queues are filtered at block 403. At block 405, a determination is made as to whether there is a significant delay (or the latency is greater than a predetermined threshold value (e.g., greater than 20 minutes, etc.) on one or more queues. If not, at block 407, none of the tenants using the queues is determined to be a split candidate. However, if, at block 409, the delay/latency is determined to be greater than a predetermined threshold, a predetermined number (e.g., 10 tenants) of top tenants who are determined to be consuming the most amount of thread time for their message types are computed and selected. At block 411, in one embodiment, the top tenants are then further evaluated by having filtered for consuming at least a predetermined threshold amount (e.g., less than 0.5%, etc.) of thread capacity. At block 413, the remaining tenants are evaluated and sorted by decreasing thread time while, at block 415, any split candidates are passed on to preprocess combiner 315 of FIG. 3A as facilitated by (and interchangeably referred to as) preprocess combining logic 225 of FIG. 2.

Figure 4B:
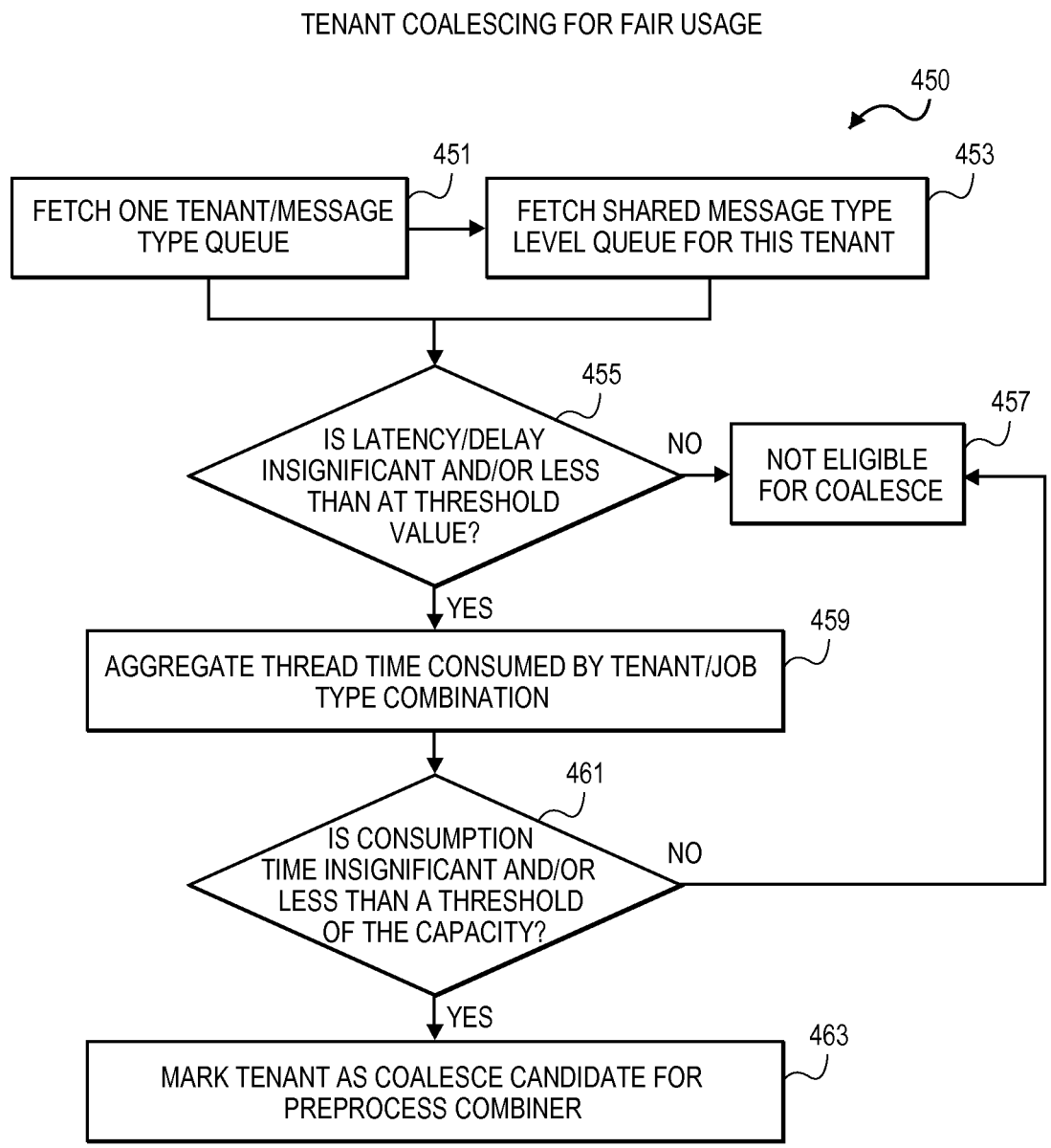
FIG. 4B illustrates a method for facilitating tenant coalescing for fair use using elastic allocation of tenant-specific queue resources according to one embodiment.

FIG. 4B illustrates a method 450 for facilitating tenant coalescing for fair use using elastic allocation of tenant-specific queue resources according to one embodiment. Method 450 may be performed by processing logic that may comprise hardware (e.g., circuitry, dedicated logic, programmable logic, etc.), software (such as instructions run on a processing device), or a combination thereof. In one embodiment, method 450 may be performed or facilitated by elastic mechanism 110 of FIGS. 1-2. The processes of method 450 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

Method 450 for tenant coalescing for fair use may begin at block 451 with fetching of a tenant and/or a message type queue. Similarly, at block 453, a shared tenant/message type level queue for this tenant is fetched. At block 455, a determination is made as to whether the delay or latency is insignificant or less than a predetermined threshold value (e.g., less than 2 minutes, etc.) on one or more queues. If not, at block 457, none of the tenants are determined to be candidates for coalesce. If the delay or latency is insignificant, at block 459, any thread time consumed by the tenant/message type combination may be aggregated. At block 461, in one embodiment, a determination is made as to whether the time being consumed on the queues is less than a predetermined threshold value (e.g., less than 0.15%, etc.) of the thread capacity. If not, the tenants are not eligible for coalescing at block 463. However, if the time being consumed is less than the predetermined value, the relevant tenants are marked as coalesce candidates and passed on to preprocess combiner 315 of FIG. 3A as facilitated by (and interchangeably referred to as) preprocess combining logic 225 of FIG. 2.

Figure 5:
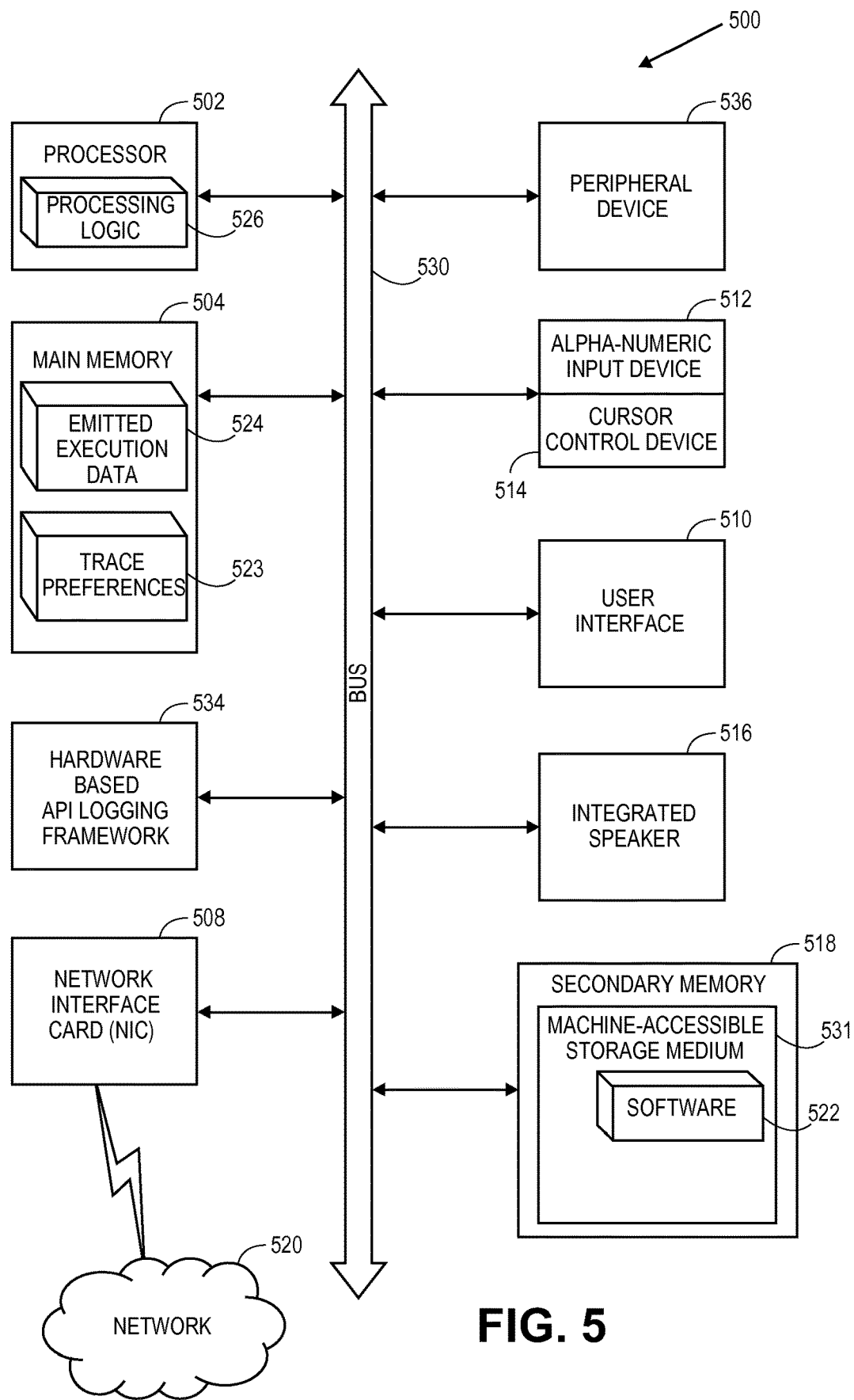
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of elastic mechanism 110 as described with reference to FIG. 1 other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of elastic mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
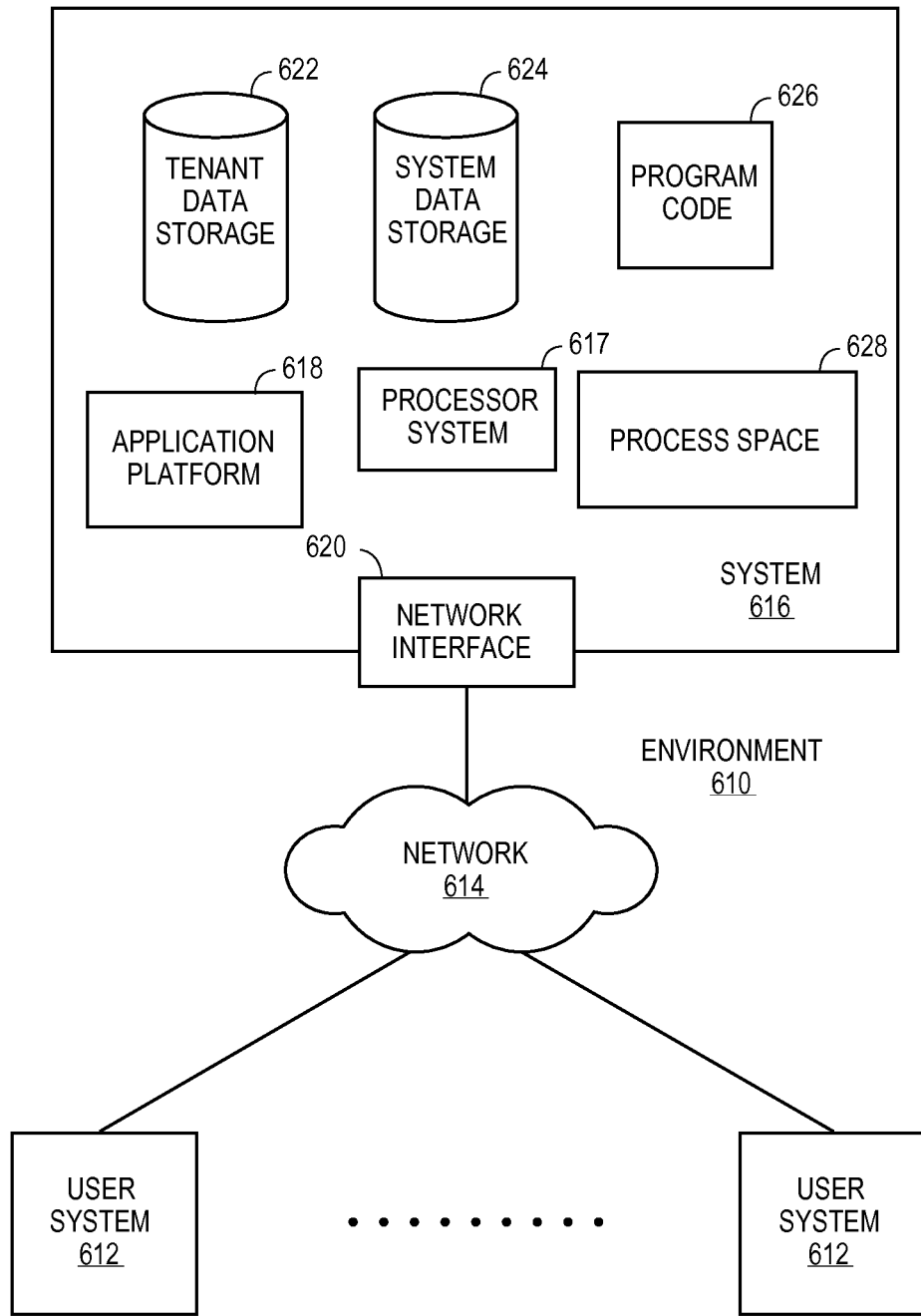
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 7:
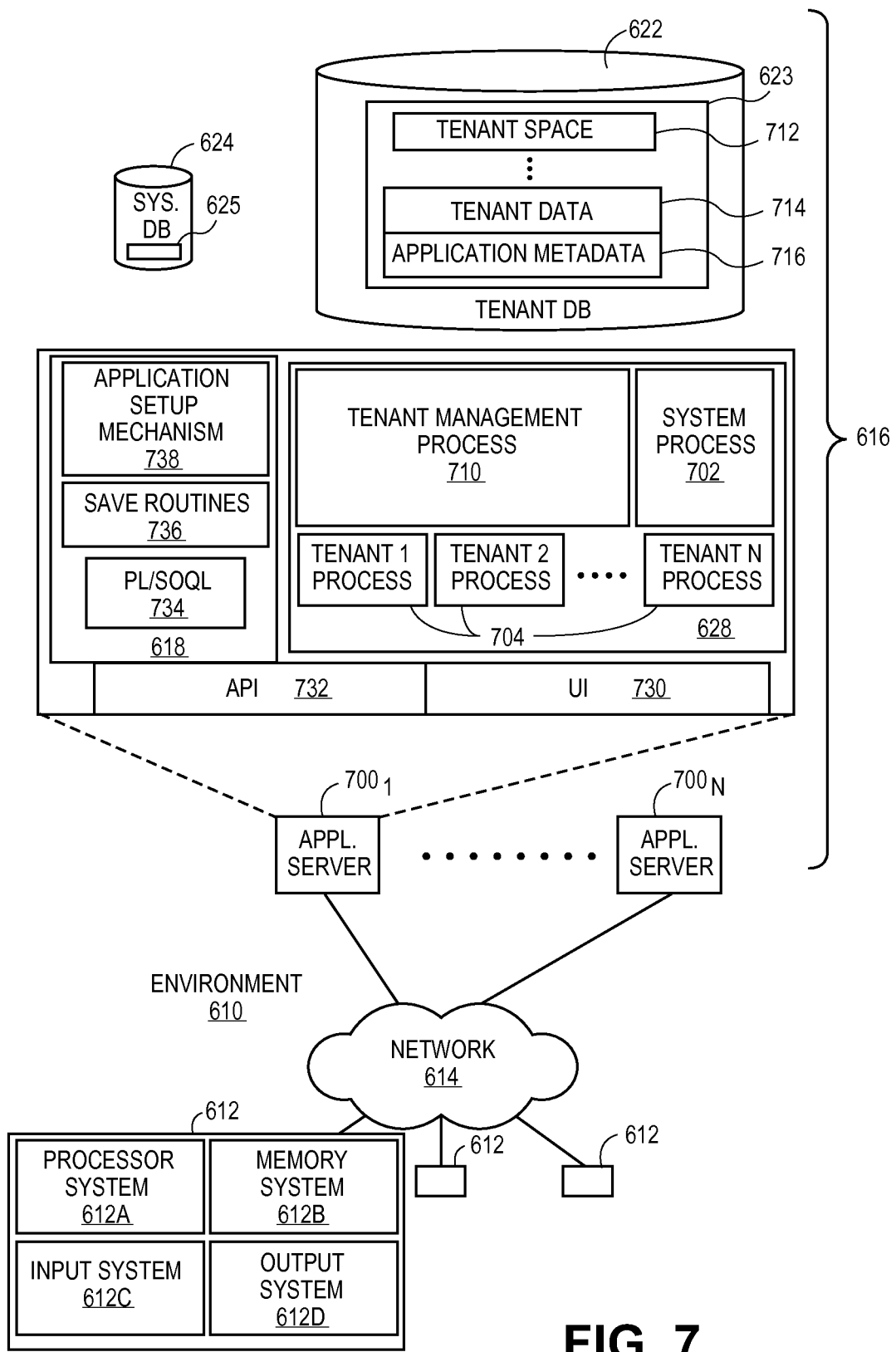
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A database system-implemented method for fair allocation of resources in a multi-tenant database environment having a fair allocation server computing device ("fair allocation device") including one or more processing devices coupled to one or more memory devices, the method comprising:

determining, in runtime, by the fair allocation device, at least one of consumption capacities associated with tenants and latency thresholds associated with job types, wherein the tenants include organizations seeking allocation of the resources for performing jobs, wherein the resources include computational threads offered through queues in the multi-tenant database environment;

identifying, in runtime, by the fair allocation device, an offender tenant and a victim tenant of the tenants based on evaluation of snapshots of the queues being used to provide access to the resources for performing the jobs corresponding to the job types associated with the tenants, the offender tenant violating at least one of a consumption capacity allocated to the offender tenant and a latency threshold associated with a first job type, wherein violating includes over-occupying of a queue by the first job type associated with the offender tenant;

isolating, in runtime, by the fair allocation device, the offender tenant from the victim tenant, wherein isolating includes facilitating the offender tenant to relinquish the queue being used for a first job of the first job type, wherein isolating further includes dynamically splitting, in runtime, the queue into multiple portions to isolate the offender tenant from the victim tenant such that the offender tenant gradually relinquishes one or more portions of the queue, while the victim tenant gradually occupies the relinquished one or more portions of the queue, wherein splitting is based on increasing or decreasing order of thread time, wherein the thread time is dynamically tracked at a granularity of time based on latency associated with one or more of the offender tenant, the victim tenant, the first job, and the first job type;

coalescing, in runtime, by the fair allocation device, the victim tenant to the queue relinquished by the offender tenant, wherein coalescing includes dedicating the queue to the victim tenant to perform a second job of a second job type associated with the victim tenant, wherein coalescing is further based on an aggregation of violations including consumption being greater than the allocated consumption capacity and latency on the queue being greater than the latency threshold representing a predetermined sliding window of time; and facilitating, in runtime, by the fair allocation device, fair allocation of the resources.

2. The method of claim 1, further comprising fetching, in runtime, by the fair allocation device, the queues associated with the tenants, wherein each queue is associated with at least a tenant and a job type, wherein isolating comprises dynamically splitting, in runtime, by the fair allocation device, offender tenants including the offender tenant from victim tenants including the victim tenant.

3. The method of claim 1, further comprising evaluating, by the fair allocation device, the offender tenants for selecting the offender tenant from the offender tenants for consuming a highest amount of over-occupation of the queue when compared to other offender tenants of the offender tenants.

4. The method of claim 3, further comprising filtering, by the fair allocation device, the offender tenant from the offender tenants and the victim tenant from the victim tenants.

5. The method of claim 1, further comprising merging, by the fair allocation device, one or more candidate offender tenants to the offender tenants if one or more queues associated with the one or more candidate offender tenants are selected to be relinquished.

6. A database system comprising:

a fair allocation server computing device ("fair allocation device") for fair allocation of resources in a multi-tenant database environment, the fair allocation device including one or more processing devices coupled to one or more memory devices, the one or more processing devices to perform operations comprising:

determining, in runtime, at least one of consumption capacities associated with tenants and latency thresholds associated with job types, wherein the tenants include organizations seeking allocation of the resources for performing jobs, wherein the resources include computational threads offered through queues in the multi-tenant database environment;

identifying, in runtime, an offender tenant and a victim tenant of the tenants based on evaluation of snapshots of the queues being used to provide access to the resources for performing the jobs corresponding to the job types associated with the tenants, the offender tenant violating at least one of a consumption capacity allocated to the offender tenant and a latency threshold associated with a first job type, wherein violating includes over-occupying of a queue by the first job type associated with the offender tenant;

isolating, in runtime, the offender tenant from the victim tenant, wherein isolating includes facilitating the offender tenant to relinquish the queue being used for a first job of the first job type, wherein isolating further includes dynamically splitting, in runtime, the queue into multiple portions to isolate the offender tenant from the victim tenant such that the offender tenant gradually relinquishes one or more portions of the queue, while the victim tenant gradually occupies the relinquished one or more portions of the queue, wherein splitting is based on increasing or decreasing order of thread time, wherein the thread time is dynamically tracked at a granularity of time based on latency associated with one or more of the offender tenant, the victim tenant, the first job, and the first job type;

coalescing, in runtime, the victim tenant to the queue relinquished by the offender tenant, wherein coalescing includes dedicating the queue to the victim tenant to perform a second job of a second job type associated with the victim tenant, wherein coalescing is further based on an aggregation of violations including consumption being greater than the allocated consumption capacity and latency on the queue being greater than the latency threshold representing a predetermined sliding window of time; and facilitating, in runtime, by the fair allocation device, fair allocation of the resources.

7. The system of claim 6, wherein the operations further comprise fetching, in runtime, by the fair allocation device, the queues associated with the tenants, wherein each queue is associated with at least a tenant and a job type, wherein isolating comprises dynamically splitting, in runtime, offender tenants including the offender tenant from victim tenants including the victim tenant.

8. The system of claim 6, wherein the operations further comprise evaluating the offender tenants for selecting the offender tenant from the offender tenants group for consuming a highest amount of over-occupation of the queue when compared to other offender tenants of the offender tenants.

9. The system of claim 8, wherein the operations further comprise filtering the offender tenant from the offender tenants group and the victim tenant from the victim tenants.

10. The system of claim 6, wherein the operations further comprise merging one or more candidate offender tenants to the offender tenants if one or more queues associated with the one or more candidate offender tenants are selected to be relinquished.

11. A non-transitory machine-readable medium having stored thereon instructions which, when executed by a processing device of a fair allocation server computing device, cause the processing device to perform operations comprising:

determining, in runtime, at least one of consumption capacities associated with tenants and latency thresholds associated with job types, wherein the tenants include organizations seeking allocation of the resources for performing jobs, wherein the resources include computational threads offered through queues in the multi-tenant database environment;

identifying, in runtime, an offender tenant and a victim tenant of the tenants based on evaluation of snapshots of the queues being used to provide access to the resources for performing the jobs corresponding to the job types associated with the tenants, the offender tenant violating at least one of a consumption capacity allocated to the offender tenant and a latency threshold associated with a first job type, wherein violating includes over-occupying of a queue by the first job type associated with the offender tenant;

isolating, in runtime, the offender tenant from the victim tenant, wherein isolating includes facilitating the offender tenant to relinquish the queue being used for a first job of the first job type, wherein isolating further includes dynamically splitting, in runtime, the queue into multiple portions to isolate the offender tenant from the victim tenant such that the offender tenant gradually relinquishes one or more portions of the queue, while the victim tenant gradually occupies the relinquished one or more portions of the queue, wherein splitting is based on increasing or decreasing order of thread time, wherein the thread time is dynamically tracked at a granularity of time based on latency associated with one or more of the offender tenant, the victim tenant, the first job, and the first job type;

coalescing, in runtime, the victim tenant to the queue relinquished by the offender tenant, wherein coalescing includes dedicating the queue to the victim tenant to perform a second job of a second job type associated with the victim tenant, wherein coalescing is further based on an aggregation of violations including consumption being greater than the allocated consumption capacity and latency on the queue being greater than the latency threshold representing a predetermined sliding window of time; and facilitating, in runtime, by the fair allocation device, fair allocation of the resources.

12. The non-transitory machine-readable medium of claim 11, wherein the operations further comprise fetching, in runtime, by the fair allocation device, the queues associated with the tenants, wherein each queue is associated with at least a tenant and a job type, wherein isolating comprises dynamically splitting, in runtime, offender tenants including the offender tenant from victim tenants including the victim tenant.

13. The non-transitory machine-readable medium of claim 11, wherein the operations further comprise evaluating, the offender tenants for selecting the offender tenant from the offender tenants for consuming a highest amount of over-occupation of the queue when compared to other offender tenants of the offender tenants.

14. The non-transitory machine-readable medium of claim 13, wherein the operations further comprise filtering the offender tenant from the offender tenants group and the victim tenant from the victim tenants.

15. The non-transitory machine-readable medium of claim 11, wherein the operations further comprise merging one or more candidate offender tenants to the offender tenants if one or more queues associated with the one or more candidate offender tenants are selected to be relinquished.

* * * * *